(12) United States Patent
Rattunde

(10) Patent No.: US 9,296,077 B2
(45) Date of Patent: Mar. 29, 2016

(54) MACHINING APPARATUS FOR ENDS OF ELONGATE PROFILE SECTIONS AND A POSITION-DETERMINING DEVICE THEREFOR

(71) Applicant: RATTUNDE & CO. GMBH, Ludwigslust (DE)

(72) Inventor: Ulrich Rattunde, Bentwisch (DE)

(73) Assignee: RATTUNDE & Co. GmbH, Ludwigslust (DE)

( * ) Notice: Subject to any disclaimer, the term of this patent is extended or adjusted under 35 U.S.C. 154(b) by 79 days.

(21) Appl. No.: 14/368,964

(22) PCT Filed: Dec. 28, 2012

(86) PCT No.: PCT/EP2012/077041
§ 371 (c)(1),
(2) Date: Jun. 26, 2014

(87) PCT Pub. No.: WO2013/098385
PCT Pub. Date: Jul. 4, 2013

(65) Prior Publication Data
US 2015/0033928 A1 Feb. 5, 2015

(30) Foreign Application Priority Data
Dec. 28, 2011 (DE) .......................... 10 2011 057 093

(51) Int. Cl.
*G01B 5/25* (2006.01)
*B23Q 1/01* (2006.01)

(52) U.S. Cl.
CPC ........ *B23Q 1/01* (2013.01); *B23Q 1/015* (2013.01); *B23Q 1/017* (2013.01); *B23Q 2240/007* (2013.01); *Y10T 83/0259* (2015.04)

(58) Field of Classification Search
CPC .......... B23Q 1/01; B23Q 1/015; B23Q 1/017; B23Q 22/40; Y10T 83/0259
USPC ............................................ 33/613, 626, 645
See application file for complete search history.

(56) References Cited

U.S. PATENT DOCUMENTS

| 2,285,572 | A |  | 6/1942 | Dillenbach |
| 2,584,558 | A |  | 2/1952 | Da Costa |
| 3,703,833 | A |  | 11/1972 | Olah |
| 3,987,523 | A |  | 10/1976 | Nelson et al. |
| 5,127,140 | A |  | 7/1992 | Oiwa et al. |
| 2003/0034336 | A1 | * | 2/2003 | Erlenmaier ............ B23K 26/06 219/121.67 |
| 2005/0265639 | A1 | * | 12/2005 | Bauer .................... B23Q 1/017 384/45 |
| 2012/0241586 | A1 | * | 9/2012 | Rattunde ................. B25B 1/20 248/534 |
| 2013/0206438 | A1 | * | 8/2013 | Hessbrueggen ..... B23Q 1/4876 173/39 |

(Continued)

FOREIGN PATENT DOCUMENTS

| CA | 2 218 162 | A1 | 4/1990 |
| DE | 1 463 226 | A | 4/1970 |

(Continued)

*Primary Examiner* — G. Bradley Bennett
(74) *Attorney, Agent, or Firm* — Lazaris IP

(57) ABSTRACT

The invention relates to a processing device (1) for elongate profile sections (2) comprising a clamping device (4) by means of which the elongate profile section (2) can be secured in a positionally stable manner, and a processing tool (6) by means of which the secured elongate profile (2) can be processed, a central component (5) being provided that has at least one first integrated guide (7) for the processing tool (6) and at least one second integrated guide (10, 11) for the clamping device (4).

9 Claims, 3 Drawing Sheets

(56) References Cited

U.S. PATENT DOCUMENTS

| | | | | |
|---|---|---|---|---|
| 2014/0260841 | A1* | 9/2014 | Honegger | B23Q 5/36 82/157 |
| 2014/0308087 | A1* | 10/2014 | Tullmann | B23Q 1/015 409/134 |
| 2014/0319746 | A1* | 10/2014 | Kozawa | B23Q 7/04 269/14 |

FOREIGN PATENT DOCUMENTS

| | | |
|---|---|---|
| DE | 85 26 362 U1 | 1/1986 |
| DE | 34 41 890 A1 | 5/1986 |
| DE | 199 54 369 A1 | 5/2001 |
| DE | 10 2006 005 020 A1 | 8/2007 |
| DE | 10 2010 021 247 A1 | 11/2011 |
| EP | 0 659 520 A1 | 6/1996 |
| EP | 1 193 027 A2 | 9/2001 |

* cited by examiner

MACHINING APPARATUS FOR ENDS OF ELONGATE PROFILE SECTIONS AND A POSITION-DETERMINING DEVICE THEREFOR

CROSS REFERENCE TO RELATED PATENT APPLICATIONS

This patent application is filed herewith for the U.S. National Stage under 35 U.S.C. §371 and claims priority to PCT application PCT/EP2012/077041, with an international filing date of Dec. 28, 2012. The contents of this application are incorporated in their entirety herein.

BACKGROUND OF THE INVENTION

Machining apparatus for elongate profile sections are known in the prior art, for example from DE 1 463 226 A.

The known machining apparatus for pipe sections have a clamping apparatus and a machining tool which are both designed in the form of separate components. On account of the multiple-part and open design the components have play relative to each other under stress. The play is too great for high-precision machining of elongate profile sections.

BRIEF SUMMARY OF THE INVENTION

The object of the present invention is therefore to provide a machining apparatus for elongate profile sections, which has a higher degree of precision as compared with the prior art, as well as a position-determining device, which will allow a sufficiently precise determination of the position of a clamped elongate profile section.

An elongate profile section is understood in this case to be sections of elongate profiles cut to length. An elongate profile is understood to be solid profiles or hollow profiles which have any desired cross-section, and in particular also tubes. It is preferable for the elongate profiles to be produced completely from metal, and preferably from steel.

The machining apparatus according to the invention has a clamping device for clamping the elongate profile section and a machining tool for machining, in particular, the end of the elongate profile section. According to the invention a central component with at least one first integrated guide for the machining tool and at least one second integrated guide for the clamping device are provided.

On account of the more compact and more rigid design of the machining apparatus by a central component preferably designed in one piece and having guides integrated in the component, the machining tool and the clamping device can be moved towards each other with a significantly greater degree of precision as compared with the named prior art.

In a preferred embodiment of the invention the at least one guide is formed in an integral manner in a first wall of the central component and the at least one second guide is formed in an integral manner in a second wall of the central component. In this case the first and second walls can be arranged at an angle, preferably at a right angle to each other. The term "integral" is to be understood in this case as being that the guides are formed in the material of the central component, for example by wire erosion, and the guide and the component are formed in one piece. As a result of the integral design of the guides in the wall of the one-piece component, the guides are stable in position relative to each other even under stress, and the two tools, the clamping device and the machining tool can be moved in their movement relative to one another in a highly precise manner.

It is preferable for the at least one first guide to be designed in the form of a tongue-and-groove engagement with positive locking. It is advantageous to form the groove along the first wall of the central component over the entire longitudinal extension of the central component. The groove can be made rectangular, but also trapezoidal or another shape, in a cross-section at a right angle to the longitudinal direction. The groove is capable of being produced in the wire erosion process. A tongue, which projects from the machining tool and which preferably likewise extends on the underside of the machining tool over the entire longitudinal extension thereof and is shaped in a highly precise manner, for example likewise by wire erosion, engages in the groove. Although the machining tool is arranged so as to be movable in the longitudinal direction in the guide, no play is provided, so that the machining tool remains arranged stable in position with respect to the central component even during the machining procedure of the elongate profile section.

In a further preferred embodiment of the invention, the at least one second guide has two supports movable in opposite directions. The two supports can be connected by way of one arm in each case to one clamping jaw in each case, the interaction of the clamping jaws making it possible for the elongate profile section to be firmly clamped in order to convey it for machining by the machining tool.

It is preferable for the two supports to have, on facing outer walls, a serrated profile which co-operates with a toothed wheel which is arranged between the two supports and has a corresponding set of teeth. By rotating, the toothed wheel can drive the two supports in an opposed direction by way of the engagement of the teeth. In this case, depending upon the direction of rotation, one support is moved in the direction of travel and at the same time the other support is moved in a direction opposed to the direction of travel or precisely vice versa. The supports are movable in a highly precise manner with respect to each other by the drive of the toothed wheel.

In order to increase the stability of the guidance in the direction of travel, it is advantageous for outer walls [of] each of the supports to have a corrugated profile to increase the contact face with the second guides. In this case the corrugated profile is orientated in the direction of travel, for example in the form of a zigzag profile in the cross-section at a right angle in the direction of travel. The corrugated profile can be provided on all the outer walls or only on some outer walls of the support. The support is made rectangular or square in a cross-section at a right angle to the direction of travel, preferably over the entire length thereof in the direction of travel. The second guides have a corresponding corrugated profile on the inner wall thereof.

The first and second guides extend preferably over the entire length of the respective wall of the central component. As a result, it is possible for the guides to be formed by wire erosion in the wall of the, in particular metallic, component.

It is advantageous for each of the two supports to have arranged on it an arm with a clamping jaw, by the co-operation of which the elongate profile section cut to length is capable of being positioned in front of the machining tool in the precise position for machining.

In a second aspect, in order to attain the object, a position-determining device with a distance sensor according to claim 8 is provided.

The position-determining device is intended in particular for installation, preferably for double installation, in one of the above machining apparatus. The position-determining device is provided adjacent to each of the supports and is intended to determine the precise position of the supports in the direction of travel.

The position-determining device has a distance sensor with a scanning beam which is orientated in a measurement direction and which is orientated towards a measurement face oblique in the direction of travel, and the support, which is capable of being moved transversely, preferably at a right angle to the measurement direction, has a smooth measurement face which slopes obliquely in the direction of travel. During the clamping or release procedure of the elongate profile section the support is moved in the direction of travel, and the measurement face passes through the scanning beam of the distance sensor along the direction of travel. Since the measurement face is positioned obliquely with respect to the scanning beam, the distance varies depending upon the position of the support along the direction of travel between the measurement point on the measurement face and the distance sensor. Conclusions can be drawn on the exact position of the support in the direction of travel from the varying distance between the distance sensor and the measurement point on the measurement face. By this exact determination of the position of the tube section cut to length it is possible for the machining tool to be determined in a highly precise manner during each machining procedure and for a highly precise machining of the end of the elongate profile section to be carried out by bevelling for example.

BRIEF DESCRIPTION OF THE SEVERAL VIEWS OF THE DRAWINGS

The invention is described with reference to an embodiment in four figures. In the figures

DETAILED DESCRIPTION OF THE INVENTION

Figure 1:
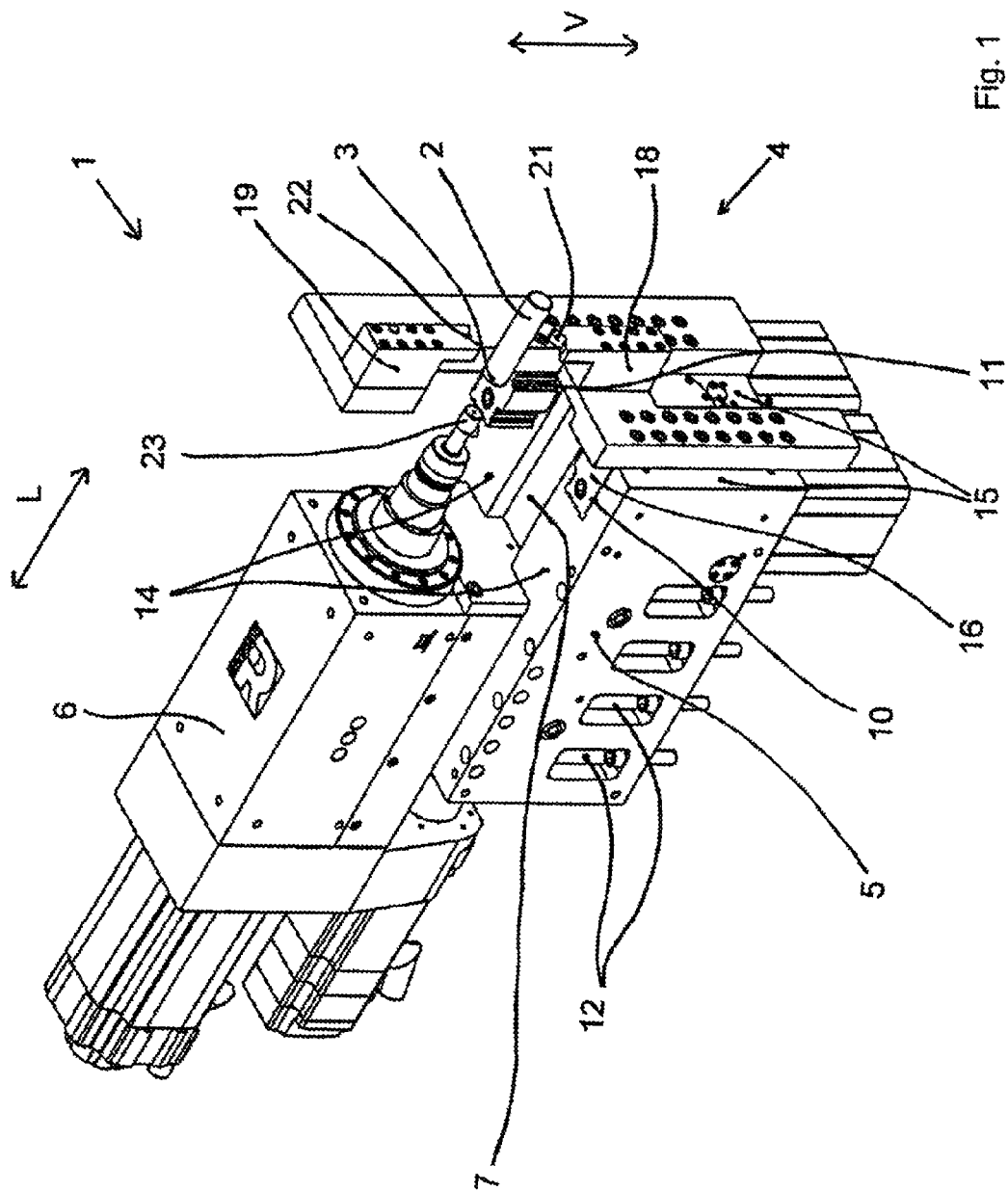
FIG. 1 is a perspective view of a machining apparatus according to the invention with a machining tool and a clamping device.

The drawings are not to scale. FIG. 1 shows the machining apparatus 1 as part of a tube-sawing machine. The tube-sawing machine itself is not illustrated in the figures. Tube-sawing machines allow sections to be sawn off from metal tubes, in particular as a special form of the elongate profiles, and the tube sections 2 sawn off can then be further machined at the ends 3 thereof in the machining apparatus 1 claimed here. This further machining can be for example a bevelling along the face of the tube section 2 cut to length. The tube sections 2 have to be machined at the adequate degree of precision in the pm range.

In order to achieve this precise machining of the tube section ends 3 the tube section 2 must be clamped in a highly precise manner by means of a clamping device 4 and a machining tool 6 must be moved relative to the clamping device 4 in a highly precise manner towards the clamped tube section 2. The machining apparatus 1 according to the invention achieves its high degree of precision in that a first guide 7 of the machining tool 6 and two guides 10, 11 of the clamping device 4 are formed integrally in the same central component which is preferably designed in the form of a metal block 5. Other materials, however, are also possible.

The metal block 5 is in this case made cuboidal with lateral apertures 12, in which case a groove made rectangular in the cross-section at a right angle to the longitudinal direction L, extending over the longitudinal direction L of the wall 14 and designed in the form of a guide 7 is formed integrally in the upper wall 14. The guide 7 is made narrow in the portion adjacent to the clamping device 4, i.e. it is less than ⅓ of the width of the machining tool 6.

In the wall 15 of the metal block 5 in front at the right in FIG. 1, i.e. facing the clamped tube section 2 during the machining, two second guides 10, 11, which extend in the direction of travel V and which are arranged on the one hand at a right angle to and in addition to the right and left of the first guide 7, are provided at a right angle to the first guide 7 extending in the longitudinal direction L. The two guides 10, 11 are formed in a front wall 15 of the metal block 5 in front and facing the clamping tool 4. The two second guides 10, 11 are provided on the inside along their guide wall with an internal profile orientated in the direction of travel V. The internal profile orientated in the direction of travel V is corrugated in the cross-section at a right angle to the direction of travel V. The internal profile of the two second guides 10, 11 serves to increase the contact face between the two second guides 10, 11 and to increase the supports 16, 17 formed in the two guides 10, 11 and likewise provided with a corrugation formed in a corresponding manner.

The two supports 16, 17 are moved in opposed directions at the same time in order to clamp the sawn-off metallic tube section 2. A left-hand and a right-hand clamping arm 18, 19 with one clamping jaw 21, 22 in each case extends from each of the two supports 16, 17. The left-hand support 16 in FIG. 1 has a clamping jaw 21 provided below—i.e. facing the ground—the tube section 2 cut to length in the clamped state, whereas the right-hand support 17 in FIG. 1 has a clamping jaw 22 arranged above the tube section 2 cut to length. The two clamping jaws 21, 22 are arranged at ends of the two left-hand and right-hand clamping arms 18, 19 extending from the supports 16, 17, and they retain their relative position with respect to the supports 16, 17 even while under stress.

The machining tool 6 is capable of being moved in a reciprocating manner in the longitudinal direction L at a right angle to the direction of travel V and it has an attachment 23 for the bevelling tool (not shown here). The machining tool 6 carries out a rotational movement. The tube section 2 cut to length is held centred in front of the machining tool 6 by means of the clamping jaws 21, 22, and the machining tool 6 can then be moved in the longitudinal direction L along the first guide 7 in a highly precise manner with respect to the tube section 2 cut to length.

Figure 2:
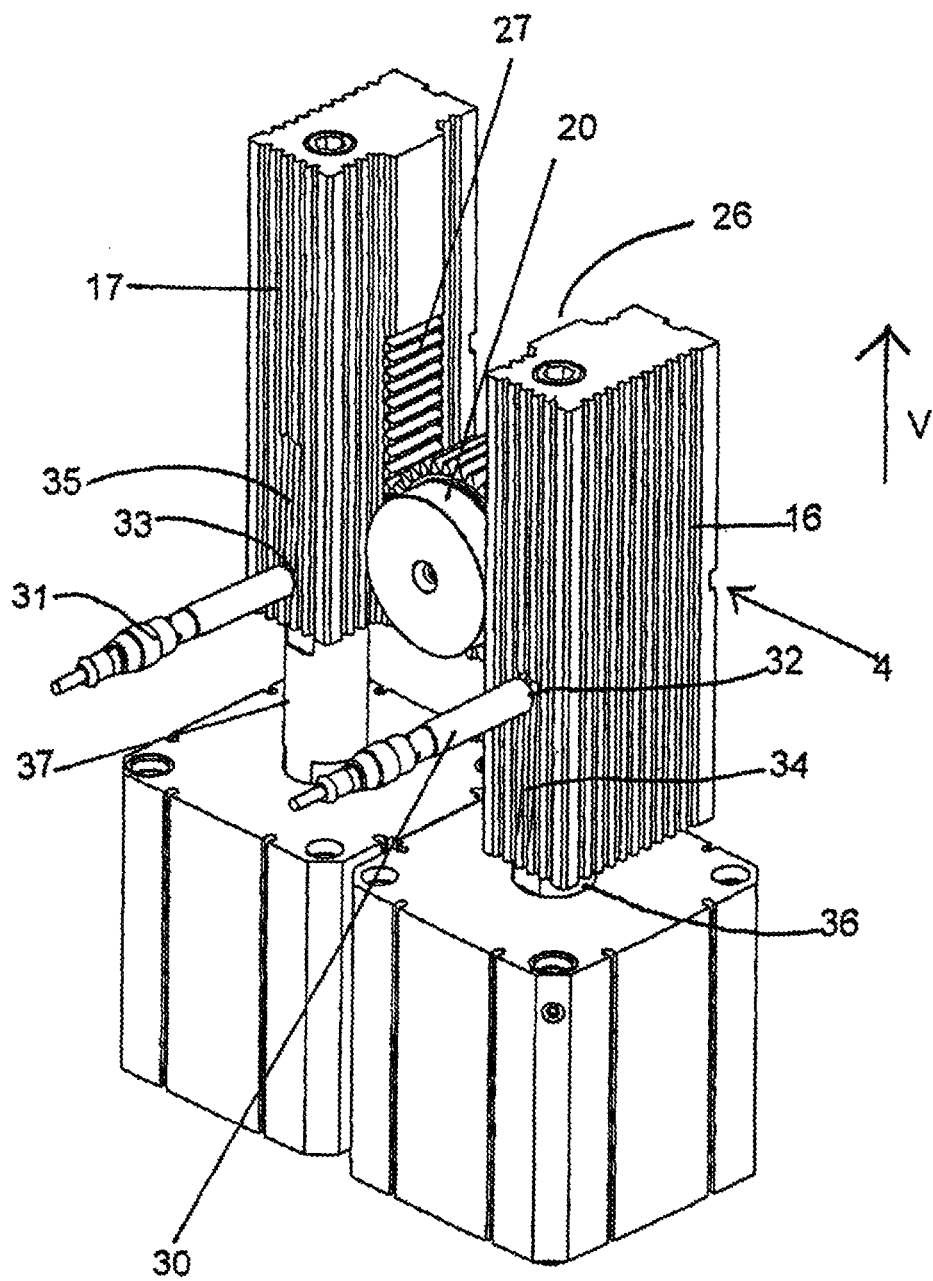
FIG. 2 is a perspective view from the rear of part of the clamping device of the machining apparatus with a position-determining device in FIG. 1.

FIG. 2 shows the clamping device 4 of FIG. 1 in a separate illustration without a metal block 5 and without the two clamping arms 18, 19. To this end, the two supports 16, 17 are removed out of the second guides 10, 11, but they retain their relative position with respect to each other as shown in FIG. 1. The two supports 16, 17 are driven in each case by way of a left-hand cylinder 36 and a right-hand cylinder 37 respectively. The two supports 16, 17 have a rod-shaped serrated profile 26, 27 which is provided in each case on an inner wall of the support 16, 17—facing the other support 16, 17—along the direction of travel V. The two serrated profiles 26, 27 co-operate with teeth of a toothed wheel 20 arranged so as to be rotatable between the two supports 16, 17. The toothed wheel 20 guides the two supports 16, 17 and precisely defines their relative position.

In FIG. 2 the tube section 2 is clamped by the driving of the cylinders 36, 37, in that the two clamping arms 18, 19 comprising clamping jaws 21, 22 are moved up to each other until the two clamping jaws 21, 22 rest in a fixed manner on the outer face of the tube section 2. The end 3 of the clamped tube section 2 is machined by means of the machining tool 6. The two supports 16, 17 are moved away from each other again by the driving of the cylinders 36, 37 in the opposite direction, i.e. the left-hand support 16 moves upwards and the right-hand support 17 moves downwards, and the two clamping jaws 21, 22 are moved away from each other and the machined tube section 2 is released and conveyed further.

In addition, two structurally similar position-determining devices 30, 31 according to the invention are indicated in FIG. 2. In the metal block 5 of FIG. 1 an associated position-determining device 30, 31 with one distance sensor 32, 33 in each case is provided for each of the two supports 16, 17. With its measurement direction orientated in the longitudinal direction L the left-hand distance sensor 32 is orientated to a left-hand measurement face 34 of the left-hand support 16. The left-hand distance sensor 32 has a measurement range in the measurement direction of from 0.5 mm to 1.5 mm with a degree of accuracy in or below the pm range. This applies in a similar manner to the right-hand side.

Each of the two supports 16, 17 has a measurement face 34, 35 which is arranged obliquely and sloping in the direction of travel V of the support 16, 17 and which is moved through the measurement region of each of the two distance sensors 32, 33 during the movement in the direction of travel V. As a result of the oblique arrangement of the measurement faces 34, 35 the distance between the distance sensor 32, 33 and a measurement point on the respective measurement face 34, 35 changes depending upon the position of the supports 16, 17 in the direction of travel V. With reference to the distance conclusions can be drawn on the exact position of each of the two supports 16, 17 along the direction of travel V. The distance sensors 32, 33 are in this case inductive measurement sensors.

Figure 4:
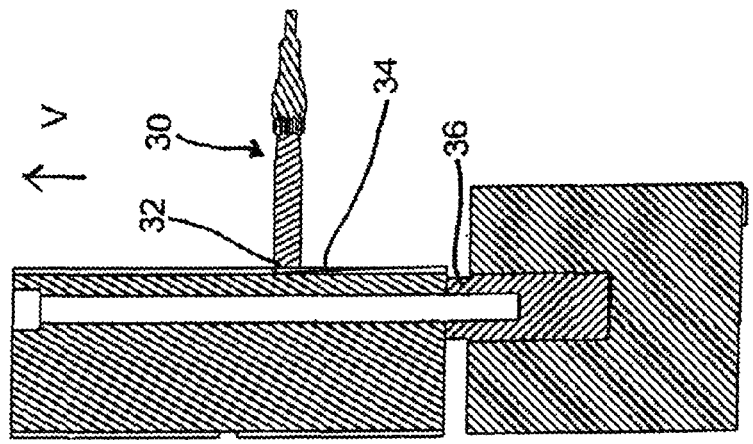
FIG. 4 is a section along the line IV-IV in FIG. 3.
Figure 3:
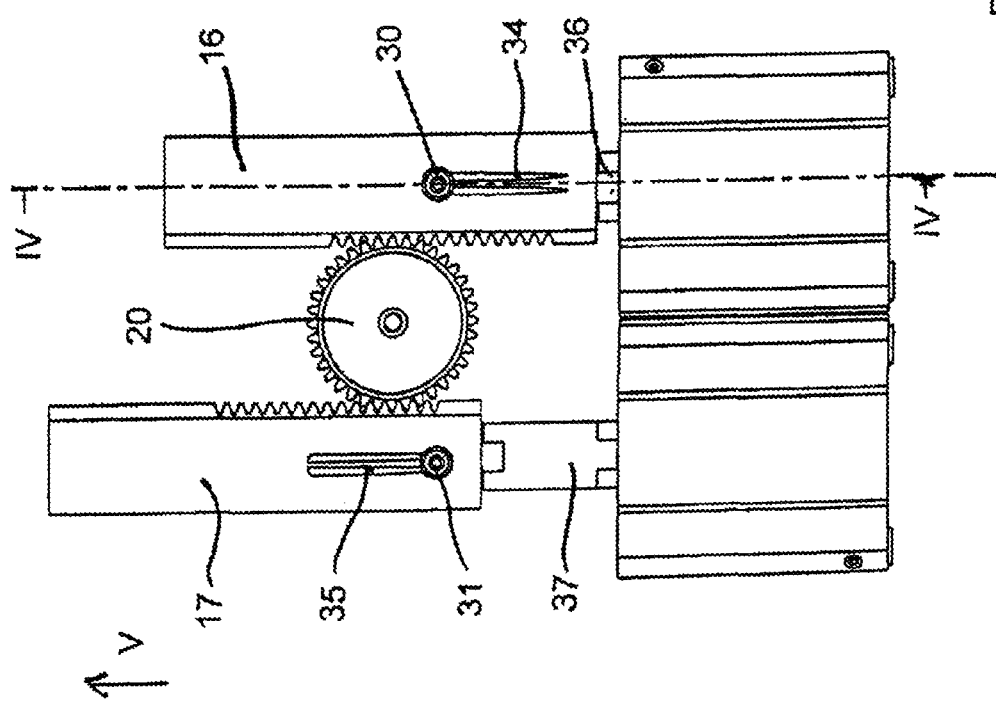
FIG. 3 is a rear view of the part of the clamping device of the machining apparatus with a position-determining device in FIG. 2.

FIG. 3 and FIG. 4 show the arrangement of the position-determining devices 30, 31 once again in a diagrammatic manner in a precisely rearward view, i.e. to the left from the rear in FIG. 1. The left-hand support 16 illustrated in FIG. 2 is introduced completely into the metal block 5, whereas the right-hand support 17 in FIG. 2 is withdrawn from the metal block 5 to the maximum degree. The two supports 16, 17 are guided by a toothed wheel 20, so that the relative position thereof is determined in a highly precise manner, i.e. in the pm range. The two supports 16, 17 are driven by cylinders 36, 37 associated with them. The right-hand support 17 is driven by a right-hand cylinder 37 and the left-hand support 16 is driven by a left-hand cylinder 36 (the terms "right" and "left" again refer in this case to the view as shown in FIG. 1).

In the position according to FIG. 2 and FIG. 1 the clamping device 4 is released and ready to receive a tube section 2 cut to length. In order to clamp the tube section 2, the two supports 16, 17 are moved in the direction of travel V or in a direction opposed to the direction of travel V; the support 16 is moved upwards in the direction of travel V and the support 17 downwards in a direction opposed to the direction of travel V. As a result, the two clamping jaws 21, 22 (not shown) are moved towards each other and the tube section 2 cut to length is clamped.

The position-determining devices 30, 31 are directed towards the oblique measurement faces 34, 35.

FIG. 4 shows the arrangement of FIG. 3 in a section along the line IV-IV. The oblique measurement face 34 with respect to the direction of travel V should be noted. The distance sensor 32 has a measurement range of from 0.5 mm to 1.5 mm, and the slope of the measurement face 34 is formed in a corresponding manner.

LIST OF REFERENCES 1 machining apparatus
2 sawn-off tube section
3 tube section ends
4 clamping device
5 metal block, central component
6 machining tool
7 first guide
10 second guide
11 second guide
12 apertures
14 upper wall
15 front wall
16 support on the left
17 support on the right
18 clamping arm on the left
19 clamping arm on the right
20 toothed wheel
21 clamping jaw
22 clamping jaw
23 attachment
26 serrated profile
27 serrated profile
30 left-hand position-determining device
31 right-hand position-determining device
32 left-hand distance sensor
33 right-hand distance sensor
34 left-hand measurement face
35 right-hand measurement face
36 cylinder on the left
37 cylinder on the right
L longitudinal direction
V direction of travel

What is claimed is:

1. A machining apparatus (1) for elongate profile sections (2) with
   a clamping device (4) by which the elongate profile section (2) is capable of being fixed so as to be stable in position and
   a machining tool (6) by which the fixed elongate profile (2) is capable of being machined,
   characterized by
   a central component (5) with at least one first integrated guide (7) for the machining tool (6) and
   at least one second integrated guide (10, 11) for the clamping device (4).

2. A machining apparatus (1) according to claim 1, characterized in that the central component (5) is designed in one piece and the at least one guide (7) is formed in an integral manner in a first wall (14) of the component (5) and the at least one second guide (10, 11) is formed in an integral manner in a second wall (15) of the component (5).

3. A machining apparatus (1) according to claim 1, characterized in that the first at least one guide (7) is designed in the form of a tongue-and-groove engagement with positive locking.

4. A machining apparatus (1) according to claim 1, characterized in that the second guide (10, 11) comprises two supports (16, 17) movable in opposite directions.

5. A machining apparatus (1) according to claim 4, characterized in that the outer walls facing the two supports (16, 17) have a serrated profile (26, 27) which co-operates with a toothed wheel (20) which is arranged between the two supports (16, 17) and which, as a result of rotation, guides the two supports (16, 17) by way of the tooth engagement.

6. A machining apparatus (1) according to claim 5, characterized in that outer walls of the support (16, 17) have a corrugated profile to increase the contact face with the at least one second guide (10, 11).

7. A machining apparatus (1) according to claim 6, characterized in that each of the two supports (16, 17) has arranged on it a clamping jaw (21, 22), by the co-operation of which the elongate profile section (2) is capable of being fixed in the precise position for machining by the machining tool (6).

8. A position-determining device (30, 31) for a machining apparatus according to claim 7, with a distance sensor (32, 33) which is orientated in a measurement direction towards a measurement face (34, 35), and with a support (16, 17), which is capable of being moved transversely to the measurement direction in the direction of travel (V), and the measurement face (34, 35) is designed so as to slope obliquely in the direction of travel (V).

9. A position-determining device (30, 31) according to claim 8, characterized in that depending upon another position of the support (16, 17) in the direction of travel (V) another distance in each case can also be found between the distance sensor (32, 33) and the measurement face (34, 35).

* * * * *